(12) United States Patent
Wu

(10) Patent No.: US 9,858,006 B1
(45) Date of Patent: Jan. 2, 2018

(54) CONTEXT DRIVEN MEMORY CIRCUITS

(71) Applicant: Xilinx, Inc., San Jose, CA (US)

(72) Inventor: Ephrem C. Wu, San Mateo, CA (US)

(73) Assignee: XILINX, INC., San Jose, CA (US)

( * ) Notice: Subject to any disclaimer, the term of this patent is extended or adjusted under 35 U.S.C. 154(b) by 170 days.

(21) Appl. No.: 14/882,288

(22) Filed: Oct. 13, 2015

(51) Int. Cl.
*G06F 3/06* (2006.01)
*G06F 12/084* (2016.01)

(52) U.S. Cl.
CPC .......... *G06F 3/0635* (2013.01); *G06F 3/0604* (2013.01); *G06F 3/0673* (2013.01); *G06F 12/084* (2013.01); *G06F 2212/1016* (2013.01)

(58) Field of Classification Search
CPC .................................................. G11C 7/1075
See application file for complete search history.

(56) References Cited

U.S. PATENT DOCUMENTS

| | | | | |
|---|---|---|---|---|
| 5,978,889 A * | 11/1999 | Zigras | ................. | G06F 13/1605 711/149 |
| 7,057,962 B1 * | 6/2006 | Tan | ....................... | G11C 7/1075 365/189.04 |
| 8,099,564 B1 * | 1/2012 | Kulkarni | ............. | G06F 13/1673 711/150 |
| 8,370,557 B2 * | 2/2013 | Dama | .................. | G11C 7/1075 365/230.03 |
| 8,812,819 B1 * | 8/2014 | Langhammer | ........ | G06F 17/142 711/103 |
| 2002/0012356 A1 * | 1/2002 | Li | ........................... | H04L 45/00 370/423 |
| 2003/0026277 A1 * | 2/2003 | Pate | ........................ | H04L 47/32 370/412 |
| 2003/0172228 A1 * | 9/2003 | Chu | ....................... | G06F 3/0601 711/112 |
| 2003/0225960 A1 * | 12/2003 | Guu | ...................... | G06F 3/0601 711/103 |
| 2009/0204383 A1 * | 8/2009 | Weiss | ..................... | G06F 11/261 703/28 |

(Continued)

OTHER PUBLICATIONS

Jiang, Weirong, "Scalable Ternary Content Addressable Memory Implementation Using FPGAs," Proc. of the 2013 ACM/IEEE Symposium on Architectures for Networking and Communications Systems, Oct. 21, 2013, pp. 71-82, IEEE, Piscataway, New Jersey, USA.

(Continued)

*Primary Examiner* — Midys Rojas
*Assistant Examiner* — Khoa D Doan
(74) *Attorney, Agent, or Firm* — LeRoy D. Maunu

(57) ABSTRACT

A memory device can be used with a shared routing resource that provides access to the memory device. The memory device can include a random access memory (RAM) circuit that includes a plurality of ports configured to provide access to the RAM circuit by the shared routing resource. A memory partition register circuit can be configured to store a plurality of addresses specifying respective context partitions within the RAM circuit. A plurality of pointer register circuits that can each be associated with a corresponding port of the plurality of ports and can be configured to store a respective set of pointers that specify a location in the RAM circuit relative to a respective context partition. Addressing logic that can be configured to provide access to the RAM circuit using the respective set of pointers for each port.

19 Claims, 7 Drawing Sheets

(56) References Cited

U.S. PATENT DOCUMENTS

2011/0320724 A1\* 12/2011 Mejdrich ............... G06F 13/28
 711/125
2015/0006810 A1\* 1/2015 Busta ................... G11C 7/1075
 711/110

OTHER PUBLICATIONS

Zerbini, Carlos A., "Performance Evaluation of Packet Classification on FPGA-based TCAM Emulation Architectures," Proc. of the 2012 Global Communications Conference, Dec. 3, 2012, pp. 2766-2771, IEEE, Piscataway, New Jersey, USA.

\* cited by examiner

CONTEXT DRIVEN MEMORY CIRCUITS

TECHNICAL FIELD

The disclosure generally relates to memory circuits, and more particularly to memory circuits designed for use with multiple contexts.

BACKGROUND

There are a variety of different applications that can use memory circuits including, but not limited to, programmable logic devices (PLDs). PLDs are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay locked loops (DLLs), bus or network interfaces such as Peripheral Component Interconnect Express (PCIe) and Ethernet and so forth.

Each programmable tile can include both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are often programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

A look-up table (LUT) memory that is configured for dual function to also function as a small memory block can exhibit inefficiencies, such as increased memory size, increased access power, and increased integrated circuit (IC) area. Moreover, BRAMs often have access rates that can significantly exceed the access rates of the switching fabric. Thus, when addressing functions are carried out within the switching fabric, the speed of the switching fabric can be the limiting factor and the capabilities of the BRAM can be underutilized. These and other problems can be problematic for PLD design and their use.

SUMMARY

According to some implementations, a memory device is provided for use with a shared routing resource that provides access to the memory device. The memory device can include a random access memory (RAM) circuit that includes a plurality of ports configured to provide access to the RAM circuit by the shared routing resource. A memory partition register circuit can be configured to store a plurality of addresses specifying respective context partitions within the RAM circuit. A plurality of pointer register circuits that can each be associated with a corresponding port of the plurality of ports and can be configured to store a respective set of pointers that specify a location in the RAM circuit relative to a respective context partition. Addressing logic that can be configured to provide access to the RAM circuit using the respective set of pointers for each port.

In certain implementations, a method involves the use a memory device that is accessible through a shared routing resource. The method can include storing, in a memory partition register circuit, a plurality of addresses specifying respective context partitions within a random access memory (RAM) circuit; storing, in each of a plurality of pointer register circuits, a respective set of pointers that specify a location in the RAM circuit relative to a respective context partition, each register circuit corresponding to a port from a plurality of ports of the RAM circuit that is configured to provide access to the RAM circuit by the shared routing resource; and providing, using addressing logic, access to the RAM circuit using the respective set of pointers for each port.

Other features will be recognized from consideration of the Detailed Description and claims, which follow.

BRIEF DESCRIPTION OF THE DRAWINGS

Various aspects and features of the method, device, and system will become apparent upon review of the following detailed description and upon reference to the drawings in which.

DETAILED DESCRIPTION

Figure 1:
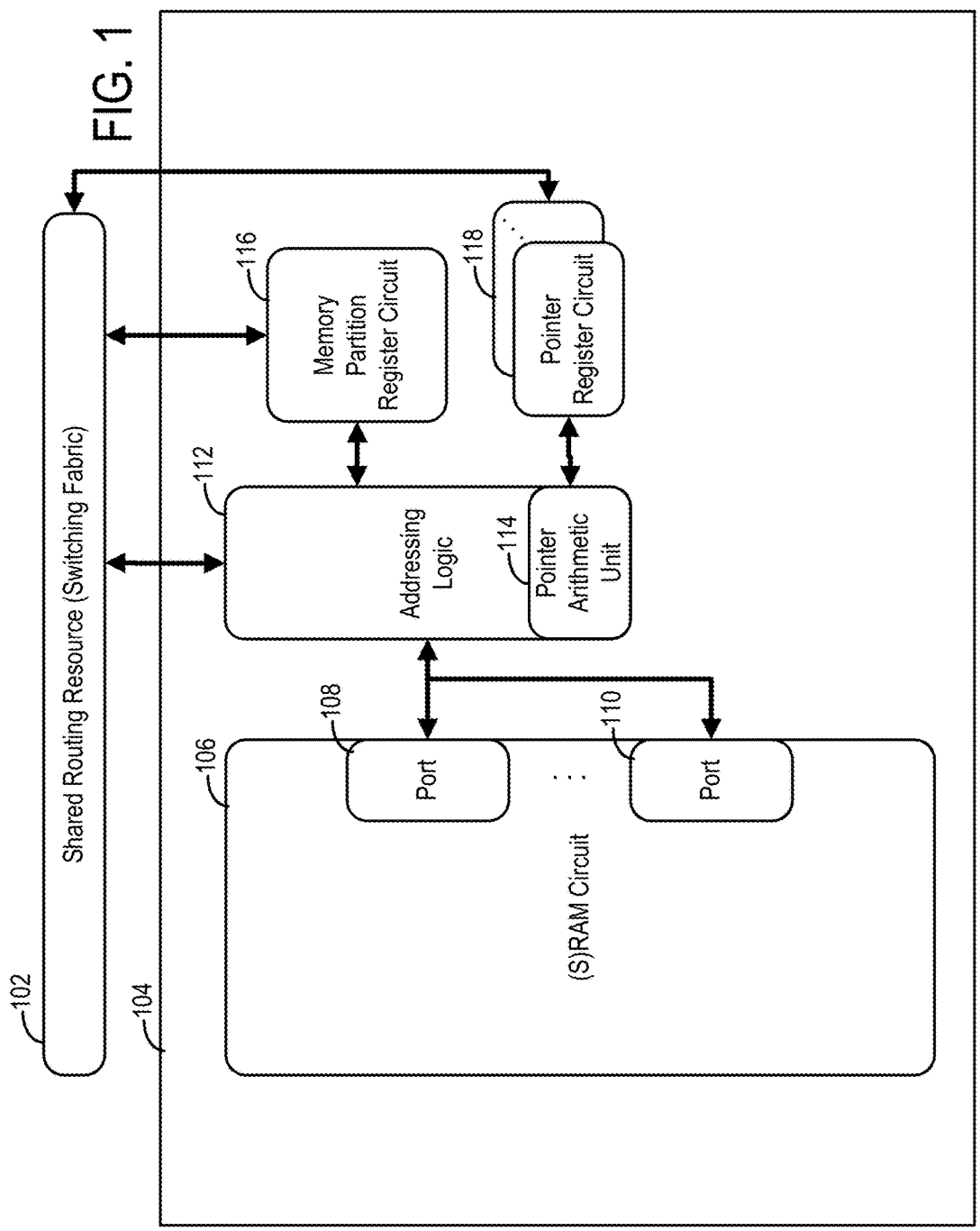
FIG. 1 depicts a block diagram for a system that includes a memory device, consistent with various implementations.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Various implementations are directed toward a memory device that is configured for use with an integrated circuit (IC) that accesses the memory device through a shared routing resource that can be used to route memory access requests from multiple sources of memory access requests (multiple contexts). The memory device can be configured to provide access to the memory of the device for the multiple contexts. Each context can be represented by a different logical memory and corresponding function. Access to a port of the memory can be time-shared between the different contexts. Without being limited thereto, various implementations can be particularly useful for taking advantage of the relatively fast access capabilities of static random-access memory (SRAM), or similar memory types. Implementations can also be useful for simplifying design and configuration of ICs by hiding the time sharing control from the application designer using specialized hardware as discussed herein. Further, implementations can provide improved power and area by reducing the memory needed to implement various functions that are commonly used in designs.

Consistent with various implementations, a shared routing resource can be implemented using a variety of different architectures and routing logic. This can include a bus architectures and switching fabrics. Functionally, the routing logic can be thought of as a set of multiplexers (muxes). For an N-input, M-output routing network, there are M muxes, each mux configured to select a subset P out of N inputs (P<=N). A crossbar switch, which is particular type of switch fabric, has P=N. A crossbar switch with a speed-up of two has M=2N and P=N. A traditional shared bus has P=N and M=1.

In some implementations, the IC can be a programmable IC that provides access to SRAM memory through the switching fabric of the programmable IC. The switching fabric serves as a shared routing resource that allows different sources of memory access requests (different contexts) to access the memory. For ease of discussion, various implementations are discussed relative to a programmable IC and switching fabric. It is understood that the implementations and features discussed relative to a programmable IC can also be used with other memory devices and systems that have similar configurations and characteristics.

For certain programmable ICs, the interconnect resources can be implemented using muxes whose select inputs are static during run time. At compile time, a programmable IC place-and-route tool can determine the select input settings for a series of muxes between a source and a destination. The mux select values can then be encoded into the programmable IC bitstream that is used to initialize the programmable IC.

Certain implementations allow for dynamic configuration of mux selection control. For instance, traffic from point A to point B on the programmable IC can be encapsulated in a packet whose header contains the address of point B, or the addresses of both points A and B. On-chip arbiters, either distributed or centralized, or both, determine the correct mux select settings dynamically (during run time). While the place-and-route tool lets the user know whether a design is routable at compile time, a run-time arbiter indicates whether a route request is satisfied during run time. When multiple inputs attempt to reach the same destination in the same arbitration cycle, the arbiter decides which input can proceed and buffers the rest of the requests. The arbiter can also take action to handle full buffers, for instance, by dropping the input request and notifying the requester that the corresponding route request has been denied.

According to certain implementations, the memory device can include a random access memory (RAM) circuit with a plurality of ports that are configured to provide access to the RAM by the switching fabric. A memory partition register circuit can be configured to store a plurality of addresses. These addresses can specify respective context partitions within the RAM circuit. A pointer register circuit can be provided for each of the ports. Each pointer register circuit can be configured to store a set of pointers that each correspond to a context partition. Addressing logic can be configured to provide access to the RAM circuit using the respective set of pointers for each port. In this manner, the pointers can be used to access the RAM circuit through a corresponding port and according to each of the different context partitions.

Aspects of the present disclosure relate to high storage density of small memory blocks that are used in computation with tight locality. Various aspects can also be useful for creating local memory blocks that can keep up with fast processors, such as fast digital signal processors (DSPs). It is further recognized that DSP can include bitwise logic to functionally emulate of ternary content-accessible memory (TCAM) for pattern-matching application that uses the small memory blocks to facilitate the TCAM emulation.

Small memory blocks, as implemented on FPGAs, can take the form of look-up table RAMS (LUTRAMs) or memory logic array blocks (MLABs). For certain FPGA designs, LUTRAMS and MLABs may be smaller than desirable for implementing as block RAMs (e.g., 18 Kb-20 Kb). Examples are local sample storage (a.k.a. sample delay lines) for digital filters, and distributed look-up tables for emulating ternary content-addressable memory (TCAM). LUTRAMs and MLABs can each be thought of as reconfigurable look-up tables (LUTs) that are essentially a collection of storage bits. In many instances, each LUT has a slow write port and a fast read port since reading from reconfigurable memory can adversely affect the operation of the PLD design. Writing into the reconfigurable memory during boot-up may be allowed to take longer without similar adverse effect. Using the LUT as a LUTRAM results in the write port being accessed during operation of the PLD design, which can increase the desired speed of the write port. It has been recognized, however, that LUTRAMs are inefficient implementing both read and write functions at fast rates. First, they are 50% larger than LUTs. Second, compared to a 128×36 SRAM-based two-port register file, a LUTRAM-based implementation uses 17.7× the read power, 35.5× the write power, and 3.7× the area. Various implementations discussed herein can be useful for providing small-memory function to dedicated SRAMs with small bit cells (e.g., relative to LUTRAMs) and for providing good density, performance, and energy consumption.

In many instances, SRAMs are able to operate at a higher frequency than the fabric in general. Accordingly, each physical SRAM instance can be (arbitrarily) partitioned into multiple memory contexts time-shared by the slower fabric logic. Consistent with various implementations, pointer circuits and logic can be used to facilitate the use of multiple contexts by developers using the SRAM and associated programmable logic.

Turning now to the figures, FIG. 1 depicts a block diagram for a system that includes a memory device, consistent with various implementations. Consistent with implementations, a number of memory devices 104 can be distributed throughout a programmable IC, such as an FPGA. The memory devices can be linked to other components of the FPGA, such as one or more DSPs, through a shared routing resource (e.g., a switching fabric) 102. As discussed herein, limitations on the speed of the switching fabric 102 may result in unused data bandwidth of the memory device 104. Accordingly, the memory device can be configured to provide time sharing access to different contexts, thereby utilizing some, or all, of the unused data bandwidth.

Memory device 104 can include a RAM circuit 106 (e.g., an SRAM circuit) that can be configured to store data that is accessible through a set of ports 108, 110. The SRAM circuit can have a number of different configurations such as, word size, number of words, numbers of ports, a single-clock, a dual-clock SRAM, or combinations thereof.

For example, the number of ports can be varied according to the particular application. For instance, the RAM circuit 106 could be configured with a single read port and a single write port. Other implementations allow for multiple read ports, multiple write ports, or both. Access to the ports can be controlled by addressing logic 112. The addressing logic 112 can respond to access requests (read or write requests), received over the switching fabric, by determining the appropriate port and address for accessing the RAM circuit 106. The determination can include identifying the appropriate context and determining the corresponding address for the identified context. By implementing the determination in the addressing logic 112, the process of this determination can be effectively "hidden" from the applications accessing the RAM circuit.

According to implementations, the addressing logic 112 can correlate an identified context with a corresponding partition in the RAM circuit 106. The partition boundaries for each context can be defined within a memory partition register circuit 116. Consistent with certain implementations, the partitions can be relatively static in that the partitions are not reconfigured for each memory access, and therefore, the speed requirements on the memory partition register circuit 116 can be relaxed. For instance, the memory partition register circuit 116 can be implemented as a control register (e.g., set of SRAM bits) that is set during configuration/programming of the FPGA device (e.g., in response to a programming bit stream that also configures various configurable logic blocks and the switching fabric 102).

Consistent with implementations, the addressing logic 112 can keep track of the access locations for the various ports and the various contexts using a set of pointer register circuits 118. For instance, a pointer register circuit 118 can be provided for each port, and each pointer register circuit 118 can store a set of registers corresponding to the available contexts. When a relevant event occurs, generally an access that uses a particular pointer, the addressing logic can update the particular pointer accordingly so that a subsequent access is to a location in the SRAM that corresponds to the update of the particular pointer. As described in more detail herein, the addressing logic can include a pointer arithmetic unit (or circuit) 114 that is configured to carry out one or more arithmetic functions that are used to determine the next pointer values during an update to the pointer values.

Figure 2:
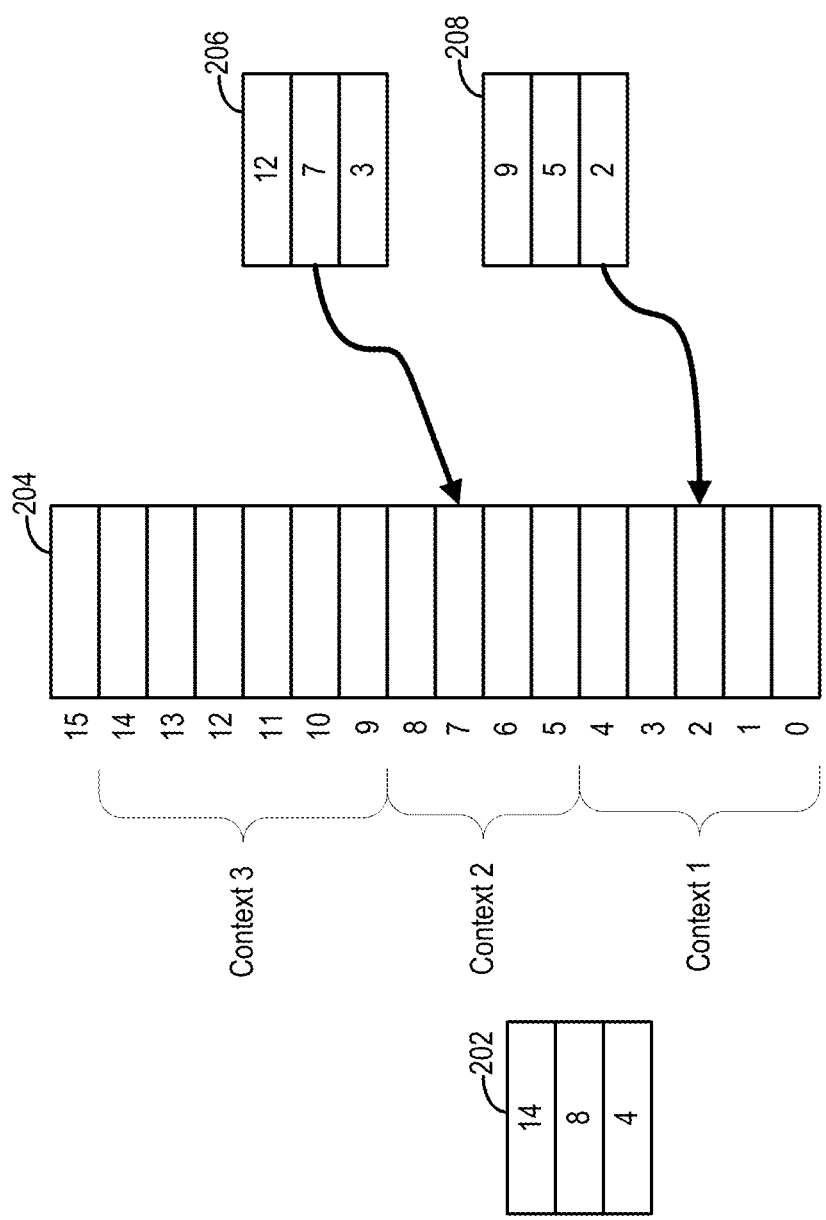
FIG. 2 depicts a memory partition table and the corresponding mapping to memory, consistent with various implementations.

FIG. 2 depicts a memory partition table and the corresponding mapping to memory, consistent with various implementations. Memory partition table 202 includes three register values 4, 8 and 14, which correspond to three different contexts, context 1, context 2, and context 3, respectively. In certain implementations, the memory partition table 202 can divide the SRAM circuit 204 into multiple contexts that are each represented by a contiguous range of SRAM addresses. The implementation depicted in FIG. 2 has non-overlapping contexts and no gaps between adjacent contexts. The particular assignment and configuration of SRAM addresses can be implemented for any number of contexts. Thus, start(1)=0 and start(i+1)=end(i)+1 for 1, 2, . . . , C, where start(i) represents the starting address of a contiguous block for context i, and end(i) represents the ending address of a contiguous block for context i. As shown in FIG. 2, the entries 4, 8 and 14, in the memory partition table 202, correspond to end(1), end(2), end(3).

In some implementations, the memory partition table can be configured as a static memory partition table during operation. The memory partition table can be initialized during programming of the FPGA and/or boot-up. The memory partition table can also be designed to allow for reconfiguration, such as through a register that can be written to by a DSP accessing the memory device through the switching fabric.

The three contexts depicted in FIG. 2 share a single SRAM of depth (D)=16 words. Context 1 is shown as starting at address 0 and occupying the address range 0 to 4 inclusive, indicated by end(1)=4; the second context spans the address range 5 to 8 inclusive, indicated by end(2)=8; and the third context occupies the address range 9 to 14 inclusive, indicated by end(3)=14. The depicted memory partition table does not contain a gap between the end of one context and the start of the next in the SRAM address space. Assuming also that the first context always starts at address 0, the memory partition table can be fully described with C entries.

In various implementations, the memory partition table can have additional flexibility in the assignment of address space to contexts. For instance, the address spaces of different contexts can overlap (e.g., to allow memory sharing between contexts). Moreover, there can be gaps between the address spaces of consecutive contexts. The additional flexibility in address space assignment can be accomplished by increasing the size of the partition table. For example, if the address spaces are each still contiguous, the above mentioned flexibility can be accounted for with 2C register entries in the partition table. In particular, each address space can be defined by both a dedicated start address and a dedicated end address.

Consistent with implementations, the memory device includes a set of a pointer register files 206 and 208 (or just "registers") that each correspond to a particular port of the SRAM. Each pointer register file 206, 208 can store an SRAM address (or "pointers") for each context and there can be one register file in each one of the SRAM ports (P). In other words, each one of the P pointer register files holds C SRAM addresses. For instance, the SRAM of FIG. 2 can have P=2 ports where one port is a read port and the other port is a write port. The two pointer register files 206, 208, one for each port, and holds C=3 pointers. Specifically, the read pointer values for contexts 1, 2, and 3 are 2, 5, and 9, respectively. The write pointer values for contexts 1, 2, and 3 are 3, 7, and 12 respectively.

When a port is accessed, the pointer value of the context that corresponds to the access can be used to determine the physical address within the SRAM. The pointer value can then be updated according to the function being emulated by the memory device. The arrows from the pointer register files 206, 208 show the current status for the read and write ports. In particular, the write context for the current cycle is 2 and the read context is 1. As a result, the current write address of the SRAM is 7 and the read address is 2.

From the vantage point of an application using the memory device, a context can serve as a pointer to a pointer to the SRAM. Let $R_p[c]$ be the SRAM address stored in pointer register file for port $p \in \{1, 2, \ldots, P\}$ corresponding to context c. The SRAM address $R_p[c]$ will be in the range specified by the partition table (controlled by the pointer arithmetic unit discussed herein). In other words, $R_p[c] \in$ [start(c), end(c)]. If this port is used to read the SRAM, then the word fetched is $M[R_p[c]]$. In FIG. 2, Port 1 has been identified as the write port and Port 2 as the read port. Accordingly, $R_1[2]=7$ and $R_2[1]=2$.

The pointer arithmetic unit can be configured to load and update the pointer register files. For example, the pointer arithmetic unit can be configured to calculate and load an initial value to for pointer register at the beginning of a loop. The pointer arithmetic unit can be configured to update the pointer register during the rest of the iterations of the loop by applying a desire arithmetic function. An update to a pointer register file may be performed after, and in response to, an SRAM access. In a general form, the pointer arithmetic unit can provide the function $a \leftarrow f(a, v)$, where the $\leftarrow$ symbol is the assignment operator. The symbol a to the left of $\leftarrow$ is the new value of the pointer a, whereas the symbol a to the right of $\leftarrow$ is the current value of the pointer. The symbol v is a vector of additional parameters. For instance, a pointer arithmetic unit that increments the address by one with wraparound may define the function $f$ as $f(a, \langle z, t \rangle) \stackrel{def}{=} (1-z)(a+1)+zt$, where $z \in \{0,1\}$ is the load flag and t is the load value. When the load flag $z=1$, the function returns the load value t; otherwise, the function returns the update value $a+1$.

With the pointer arithmetic unit, a context-specific application can use the contents of SRAM pointer register file $R_p$ to address the SRAM. The pointer arithmetic unit can thereby hide the SRAM physical address from the application, facilitating portability of the application.

Consistent with certain implementations, the memory partition table, the pointer register files, and the pointer arithmetic unit in the memory device can be configured to provide variable depth-width aspect ratios of the SRAM. Moreover, different ports of the SRAM may dimension the same SRAM differently. This may include dimensioning the SRAM differently depending on the access mode (e.g. read vs. write). For instance, a dual-port (2RW) SRAM with 64 Kb of total storage may be seen as a 64×1 Kb SRAM by the first port in the read mode and a 128×512b SRAM in the write mode, and as a 256×256b SRAM by the second port in both the read and the write mode. In general, for an SRAM with N bits and P ports, each port $p \in \{1, 2, \ldots, P\}$ in access mode a (e.g. read vs. write mode) sees a $D_{p,a} \times W_{p,a}$ SRAM, where $D_{p,a} W_{p,a} \leq N$.

Figure 3:
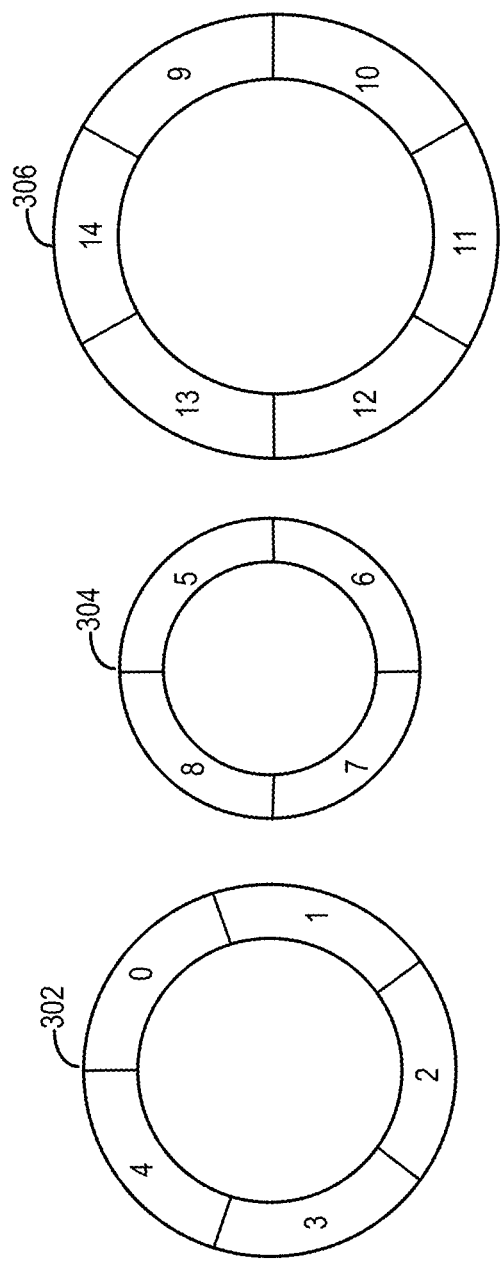
FIG. 3 shows a logical representation of register files configured as circular buffers, consistent with various implementations.

FIG. 3 shows a logical representation of register files configured as circular buffers, consistent with implementations of the present disclosure. Circular buffers can be particularly useful for digital signal processing, where a sliding window of the most recent input samples are used to compute output samples. Input samples that are no longer needed can be discarded, or, in practice, written over by a new input sample. The head of the circular buffer stores the newest input sample. By convention, clockwise movement of the write pointer from one address location to the next in the circular buffer indicates the passage of time. For example, the circular buffer 306 for context 3 can store the most recent six input samples, and occupy physical SRAM address locations 9 to 14. For a situation where input samples arrive at the circular buffer at a constant sample rate, the write pointer points to the most recent input sample. Consistent with the snapshot from FIG. 2, the sample for context 3 is at address 12, which indicates that the sample at address 11 arrived one input sample period ago, the sample at address 10 arrived two input sample periods ago, and so on until the sample at address 13, which is the oldest sample and arrived five input sample periods ago. The sample at address 13 will be written over by the next input sample one sample period later. The six-entry circular buffer can therefore supply the necessary input samples for a finite impulse response (FIR) filter of the form $\Sigma_{k=0}^{5} x[n-k]h[k]$, where $h[0]$ through $h[5]$ are the filter coefficients (stored outside of the input sample circular buffer), and $x[n]$ to $x[n-5]$ are a window of the six most recent input samples stored in the circular buffer.

A sliding window of input samples can also be captured in a shift register built from writeable LUT bits, which is sometimes referred to as shift register logic (SRL). For a shift register that stores N samples, the N−1 existing samples (other than the oldest sample) are physically shifted (relocated) to their neighboring registers. The architecture may not scale well when N is large, especially when the SRAM clock rate is much higher than the sample rate and one SRAM can store samples from many contexts. Various implementations allow for the write pointer to be advanced (e.g., as opposed to moving samples already in memory), when a new sample arrives. Such an approach can take advantage of faster, higher-density, and lower-power SRAM (compared to using SRL to store samples).

Consistent with various implementations, a memory word can read into the variable y in context c as $y \leftarrow M[R_p[c]]$, where p is a read port of the memory M. The context c is therefore a pointer to a pointer to the SRAM. The pointer arithmetic unit can be configured functionally emulate a circular logic buffer by updating the corresponding pointer as $R_p[c] \leftarrow (R_p[c] - start(c) + s) \ (mod(end(c) - start(c)+1)) + start(c)$, where the pointer $R_p[c]$ is advanced by a stride of s in a circular buffer. When s is negative, the pointer is "rewound" by s locations. Assuming that the partition table specifies the context boundary $start(c)$ and $end(c)$, a circular buffer pointer update command can be implemented with only two parameters, namely the context c and the stride s. More generally, the corresponding pointer update function is $f(R_p[c], \langle c, s, z, t \rangle) \stackrel{def}{=} zt + (1-z)((R_p[c] - start(c) + s) \ (mod \ (end(c) - start(c)+1)) + start(c))$, where the load flag z and the load value t are defined as noted above.

In certain implementations, $start(i) = end(i-1)+1$ for $i>1$ (assumes no gaps between contexts) and $start(1)=0$. Thus for $c=1$, the pointer update function can be written as $f(R_p[1], \langle 1, s, z, t \rangle) \stackrel{def}{=} zt + (1-z)((R_p[1]+s)(mod \ (end(1)+1))$, and for $c>1$, the pointer update function can be written as $f(R_p[c], \langle c, s, z, t \rangle) \stackrel{def}{=} zt + (1-z)((R_p[c] - end(c-1) - 1 + s) \ (mod \ (end(c) - end(c-1)) + end(c-1)+1)$.

For instance and commensurate with FIG. 2, an SRAM can have P=2 ports that are partitioned into C=3 contexts. Port 1 can be the write port and Port 2 can be the read port. Each partition organized as an independent circular buffer (302, 304, 306) such that the write pointer is post-incremented (e.g., using modulo operations as represented by a clockwise traversal around the circle) each time a new sample is written into the buffer. In certain examples, a new sample can be considered to arrive every eight cycles for each context. For ease of discussion, the following description relates to such examples. It is recognized, however, that different sample rates are possible, and further, that each context can have a different sample rate.

The write pointer update function (for port p=1) is $f(R_1[c], \langle c, 1, z, start(c) \rangle)$ such that the write pointer for context c is loaded with the start address of that context initially, and each update moves the pointer clockwise to the next address (one spot clockwise).

For the read port (or Port 2), whenever a new sample for context c arrives, the read pointer for the same context is loaded with a value relative to the write pointer. Since the write pointer for each context advances every eight cycles, the corresponding read pointer therefore is loaded also every eight cycles.

According to some implementations, the pointer arithmetic unit can implement read pointers for each context by using a different stride in the pointer update function. For example and for context 1, the stride can be two samples (clockwise) and the load read address is three address locations behind the write pointer (three spots counterclockwise from the write pointer); the update function can be $f(R_2[1], \langle 1, 2, z, R_1[1]-3 \pmod{(\text{end}(1)+1)} \rangle )=f(R_2[1], \langle 1, 2, z, R_1[1]-3 \pmod 5 \rangle )$. When the read pointer is defined relative to the write pointer, the application needs no knowledge of the physical SRAM address. For context 2, the stride can be set to $-1$ and the read load address is one spot behind the write pointer; the corresponding update function is $f(R_2[2], \langle 2, -1, z, R_1[2]-1 \pmod 4 \rangle )$. For context 3, the stride can be 2 and the read load address is five spots behind the write pointer; the update function for context 3 is thus $f(R_2[3], \langle 3, 2, z, R_1[1]-5 \pmod 6 \rangle )$.

For every sample written into contexts 1, 2, and 3, two, three, and three compute iterations are triggered, respectively. Each iteration reads a particular sample from the context. Because the input sample rate is one sample every eight cycles for every context, and the total number of compute iterations for all three contexts combined is 2+3+3=8, all three contexts can share one memory. Table 1 summarizes the read and write pointer values for each context according to the update functions indicated above: context $1=f(R_2[1], \langle 1, 2, z, R_1[1]-3 \pmod 5 \rangle )$; context $2=f(R_2[2], \langle 2, -1, z, R_1[2]-1 \pmod 4 \rangle )$; and context $3=f(R_2[3], \langle 3, 2, z, R_1[1]-5 \pmod 6 \rangle )$. Taking context 2 as an example, the allocated SRAM addresses are from 5 to 8. The write pointer therefore runs around the circle from 5 to 8 and back to 5, advancing one spot every eight cycles. When the write pointer for context 2 goes from 5 to 6, $R_1[2]=6$, and the read pointer for context 2 is loaded with the value that is one spot behind the write pointer, i.e. $R_2[2]=5$. Because there are three iterations and the stride is $-1$, the SRAM addresses read by these iterations before the read pointer is loaded with a new value relative to the write pointer are 5, 8, and 7. Let $x_i[n]$ be the nth sample written into the circular buffer for context i. $x_2[10]$ is therefore written into SRAM address 10-1 (mod 4)+5=6 because the circular buffer for context 2 holds four entries starting at address 5. The three iterations that read from the circular buffer are from address 5, 8, and 7, corresponding to the input samples $x_2[9]$, $x_2[8]$, and $x_2[7]$, respectively. A vector of these three input samples may form an inner product with a vector of three coefficients to compute a convolution.

with, for example, Radix-2 fast Fourier transform (FFT). Radix-2 FFT is an algorithm that accesses memory in linear address ordering and in bit-reversed ordering over memory space that is a power of two deep. An example of linear address ordering from address 0 to address 7 is 0, 1, 2, 3, 4, 5, 6, 7. Expressed in binary, the same address sequence is 3'b000, 3'b001, 3'b010, 3'b011, 3'b100, 3'b101, 3'b110, 3'b111. In bit-reversed ordering, the bits in each of the previous binary addresses are reversed and the sequence becomes 3'b000, 3'b100, 3'b010, 3'b110, 3'b001, 3'b101, 3'b011, 3'b111, or in decimal 0, 4, 2, 6, 1, 5, 3, 7. Note that the width of the address is specified since leading zeros are also reversed. FFT can contain recursive structures called butterflies such that when the write (read) address sequence is in linear order and the read (write) sequence is in bit-reversed order.

Consistent with particular implementations, multiple radix-2 FFT memory banks can share one physical SRAM by configuring each memory bank to occupy one context. The bit-reversed pointer update is $[c] \leftarrow \text{bit\_reverse}(\text{bit\_reverse}(R_p[c]-\text{start}(c), m)+1, m)+\text{start}(c)$, where m is the address width in bits. Including pointer loading, the pointer update function is $f(R_p[c], \langle c, m, z, t \rangle ) \stackrel{\text{def}}{=} zt+(1-z)(\text{bit\_reverse}(\text{bit\_reverse}(R_p[c]-\text{start}(c), m)+1, m)+\text{start}(c))$, where, $z \in \{0, 1\}$ is the load flag and t is the load value.

Radices greater than two can also be implemented to provide functional emulation of digit-reversed addressing. For example, instead of using binary digits, pointer arithmetic can be performed using digits having a larger base (e.g., base 3, 4, or larger). Now the parameter m is the number of base-k digits. Take k=3 and m=2 as an example. The address sequence is $k^m=9$ long, and each base-3 address consists of two trits (ternary digits). The sequence 0, 1, 2, 3, 4, 5, 6, 7, 8 in decimal can be expressed in base 3 with two trits as $(00)_3$, $(01)_3$, $(02)_3$, $(10)_3$, $(11)_3$, $(12)_3$, $(20)_3$, $(21)_3$, $(22)_3$. The trit-reversed sequence is $(00)_3$, $(10)_3$, $(20)_3$, $(01)_3$, $(11)_3$, $(21)_3$, $(02)_3$, $(12)_3$, $(22)_3$, which, in decimal, is 0, 3, 6, 1, 4, 7, 2, 5, 8. The pointer update function is $f(R_p[c], \langle c, m, k, z, t \rangle ) \stackrel{\text{def}}{=} zt+(1-z)(\text{reverse}(\text{reverse}(R_p[c]-\text{start}(c), m, k)+1, m, k)+\text{start}(c))$. The example implementations can support radix-2, radix-3, and radix-5 addressing, as may be useful for wireless communication processing (e.g., for cellular communications like Long-Term Evolution (LTE)).

Certain implementations are directed toward the use of SRAM memory devices to emulate ternary content-addressable memory (TCAM). A non-limiting example use for TCAM is in packet processing to match a search key against all entries in a ternary table. On a match, an action is taken by the packet processor. For instance, the search key may be

TABLE 1

| Pointer(s) | Iterations | Example Sequences | | | | | | |
|---|---|---|---|---|---|---|---|---|
| All write pointers | N/A | Context 1: 0,1,2,3,4,0,1,2, . . . <br> Context 2: 5,6,7,8,5,6,7,8, . . . <br> Context 3: 9,10,11,12,13,14,9,10, . . . | | | | | | |
| Read pointer #1 | 2 | Write | 0 | 1 | 2 | 3 | 4 | 0 | 1 |
| | | Read | 2,4 | 3,0 | 4,1 | 0,2 | 1,3 | 2,4 | 3,0 |
| Read pointer #2 | 3 | Write | 5 | 6 | 7 | 8 | 5 | 6 | 7 |
| | | Read | 8,7,6 | 5,8,7 | 6,5,8 | 7,6,5 | 8,7,6 | 5,8,7 | 6,5,8 |
| Read pointer #3 | 3 | Write | 9 | 10 | 11 | 12 | 13 | 14 | 9 |
| | | Read | 10,12,14 | 11,13,9 | 12,14,10 | 13,9,11 | 14,10,12 | 9,11,13 | 10,12,14 |

Various implementations are directed toward a pointer arithmetic unit that is designed to emulate bit-reversed addressing as a pointer pattern. This can be useful for use an IP address of a device attempting to gain access into a network, and the ternary table stores a list of incoming addresses that are allowed into the network, e.g. 192.168.1.* and 224.*.124.12. The IP address 192.168.1.10 is thus allowed into the network whereas 224.45.20.10 is rejected.

Each entry in a TCAM can be a ternary vector, in which each element is a member of the set {0,1,*}, where the wildcard '*' matches both a '0' or '1'. A TCAM performs a search of all table entries against the search key in parallel, and generates a binary vector of all entries that match the key. A '1' in bit location i of the output vector indicates that entry i matches the search key; a '0' indicates no match. For instance, a three-entry-deep, four element-wide TCAM may contain the following three entries: 11*1, 0*01, and *10*. The search key 0001 thus matches only the second entry, and the TCAM produces the three-bit result vector 010. The search key 0101 matches both the second and the third entries, and the TCAM produces 011. There may be further processing to select only one of the matches. One technique for prioritization is to store TCAM entries in priority order, for instance, the higher the entry address, the higher the priority.

Implementing the parallel search ability of the TCAM in hardware can cost power and area. Given the same number of storage bits, a hardware-implemented (native) TCAM is larger and can consume more power than a 1R1 W SRAM of the same storage capacity. Further, the specialized nature of a native TCAM can complicate the use of such TCAMs in FPGAs, which tend to contain components that are often used.

Figure 4:
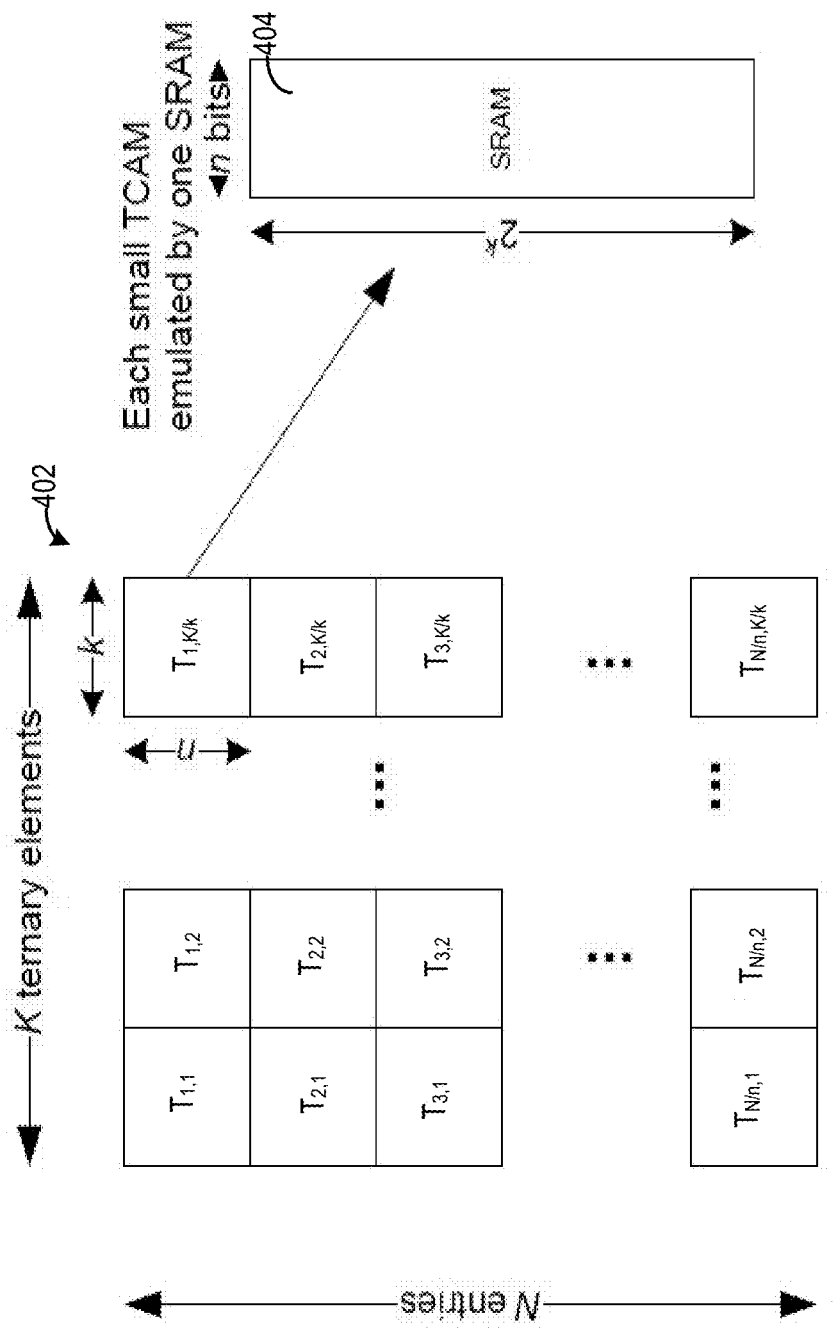
FIG. 4 depicts a N-entry-deep, K-element-wide ternary content-addressable memory (TCAM) that is implemented using a matrix of smaller TCAMs, consistent with various implementations.

Various implementations are directed toward the use of techniques to emulate a TCAM using multiple SRAMs. For instance, FIG. 4 depicts an N-entry-deep, K-element-wide TCAM that is implemented using a matrix of smaller TCAMs, consistent with various implementations. For simplicity, suppose each smaller TCAM (T) is of the same dimensions: n-entry-deep and k-element-wide. Without loss of generality, suppose N/n and K/k are both integers. The original N×K TCAM is now a two-dimensional array 402 of smaller n×k TCAMs. In particular, the array 402 has N/n rows and K/k columns.

According to implementations, the smaller TCAM units can each be emulated by a $2^k \times n$ SRAM 404. For instance, suppose n=3 and k=4 and the entries in the smaller TCAM are the same as in the previous example, i.e. 11*1, 0*01, and *10*. All $2^k$ match results from all possible k-bit keys bits are stored in an SRAM as indicated by Table 2. These values are generated by enumerating each n=3 bits wide match result vector for each of the $2^k=2^4=16$ possible keys. With the search key 0101 again as an example, the key matches both the second (0*01) and the third (*10*) TCAM entries. The SRAM entry stored at address 0101 can therefore be 011, as shown by Table 2. This corresponds the leftmost (most significant) bit representing the first entry, the middle bit representing the second entry, and the left most (least significant) bit representing the third and final entry.

TABLE 2

| SRAM Address | Match Vector |
| --- | --- |
| 0000 | 000 |
| 0001 | 010 |
| 0010 | 000 |
| 0011 | 000 |
| 0100 | 001 |
| 1101 | 011 |
| 0110 | 000 |
| 0111 | 000 |
| 1000 | 000 |
| 1001 | 000 |

TABLE 2-continued

| SRAM Address | Match Vector |
| --- | --- |
| 1010 | 000 |
| 1011 | 000 |
| 1100 | 001 |
| 1101 | 101 |
| 1110 | 000 |
| 1111 | 100 |

Relative to FIG. 4, the total number of SRAM bits used is $n2^k \lceil N/n \rceil \lceil K/k \rceil$. It is noted that the more general condition when N/n and K/k are not necessarily integers is considered. The number of SRAM bits used for emulating a TCAM is thus exponential in terms of k. As an example, consider the number of ternary entries N=512, the search key width K=256, and SRAM width n=32. Table 3 summarizes the number of $2^k \times 32$ SRAMs that would support different values of k for n=32.

TABLE 3

| k | SRAM bits | SRAM:TCAM Bit Ratio | N/n | K/k | SRAM Depth ($2^k$) | SRAM Width (n) | Number of $2^k \times n$ SRAMs |
| --- | --- | --- | --- | --- | --- | --- | --- |
| 1 | 262144 | 2 | 16 | 256 | 2 | 32 | 4096 |
| 2 | 262144 | 2 | 16 | 128 | 4 | 32 | 2048 |
| 3 | 352256 | 2.6876 | 16 | 86 | 8 | 32 | 1376 |
| 4 | 524288 | 4 | 16 | 64 | 16 | 32 | 1024 |
| 5 | 851968 | 6.5 | 16 | 52 | 32 | 32 | 832 |
| 6 | 1409024 | 10.75 | 16 | 43 | 64 | 32 | 688 |
| 7 | 2424832 | 18.5 | 16 | 37 | 128 | 32 | 592 |
| 8 | 4194304 | 32 | 16 | 32 | 256 | 32 | 512 |
| 9 | 7602176 | 58 | 16 | 29 | 512 | 32 | 464 |
| 10 | 13631488 | 104 | 16 | 26 | 1024 | 32 | 416 |
| 11 | 25165824 | 192 | 16 | 24 | 2048 | 32 | 384 |
| 12 | 46137344 | 352 | 16 | 22 | 4096 | 32 | 352 |
| 13 | 83886080 | 640 | 16 | 20 | 8192 | 32 | 320 |
| 14 | 159383552 | 1216 | 16 | 19 | 16384 | 32 | 304 |
| 15 | 301989888 | 2304 | 16 | 18 | 32768 | 32 | 288 |

While distributed LUTRAMs can used as small SRAMs to emulate a TCAM, it is noted that LUTRAMS tend to be less power- and area-efficient than SRAMs. Accordingly, various implementations are directed toward the functional emulation of TCAM using SRAMs. While it can be desirable to minimize the parameter k, the width of the partial search key, a low value of k corresponds to a shallow SRAM, which can be expensive since the overhead in peripheral circuitry such as input/outputs (IOs), sense amplifiers, decoders, repair logic, etc, can be high. It has been recognized, however, that since higher-capacity SRAMs can often run much faster than a lower-capacity LUTRAM, multiple, time-shared, logically shallow SRAMs can be packed into one fast physical SRAM to amortize the SRAM peripheral overhead.

According to certain implementations, a memory device can be designed to allow for time-sharing access to multiple logical 2k×n memory banks in one physical SRAM. In networking, the search rate is measured in million packets per second (Mpps). In many instances, every 100 Gb/s of traffic can generate 150 Mpps for a string of shortest packets, and it is generally true that the longer the packet, the lower the packet rate. Each search of an address from a packet header is therefore under the constraint: $f_s$=150 Mpps ($f_s$ is a search rate) for every 100 Gb/s of traffic. A D×W=128×32 SRAM, with one read port and one write port, can be configured to operate at $f_{clk}$=1.2 GHz. The SRAM clock rate can be, for example, eight times the packet rate ($f_{clk}/f_s$=8).

Generally speaking, the narrower the partial search key width k is, the fewer SRAM bits are needed. In this example, the SRAM size can be $2^k \times n$, where $2^k = D/(f_{clk}/f_s)$. Thus, eight instances of 16×32 SRAMs can time-share one 1.2 GHz SRAM (where the SRAM is D×W=128×32 SRAM). According to Table 3, 1024 instances of the 150 MHz 16×32 SRAM can emulate a 150 Mpps, 512×256 TCAM. Accordingly, 128 instances ($\lceil N/W \rceil \lceil K/k \rceil / (f_{clk}/f_s) = 16 \times 64/8 = 128$) of 1.2 GHz, 128×32 SRAMs can meet a desired 150 Mpps throughput.

According to certain implementations, the functional emulation of the TCAM can be supported by configuration of the pointer arithmetic unit to carry out a logical operation that is consistent with the emulation of the TCAM. For instance, a partial search key that spans $f_{clk}/f_s$ columns of the TCAM matrix in FIG. 4 is sent to the pointer arithmetic unit at a first rate ($f_s$) while the memory device runs at a faster rate ($f_{clk}$). Thus, the partial search key can include enough data for multiple accesses (where each access would each correspond to a different context and memory partition). As a result, the partial search key is $k * f_{clk}/f_s$ bits wide. The slow-fast combination can be useful for FPGA designs since the FPGA fabric is often slower than small SRAMs and hardened (standard-cell synthesized) pointer logic. The partial search key can then be matched against the corresponding columns in the TCAM matrix in FIG. 4.

Figure 5:
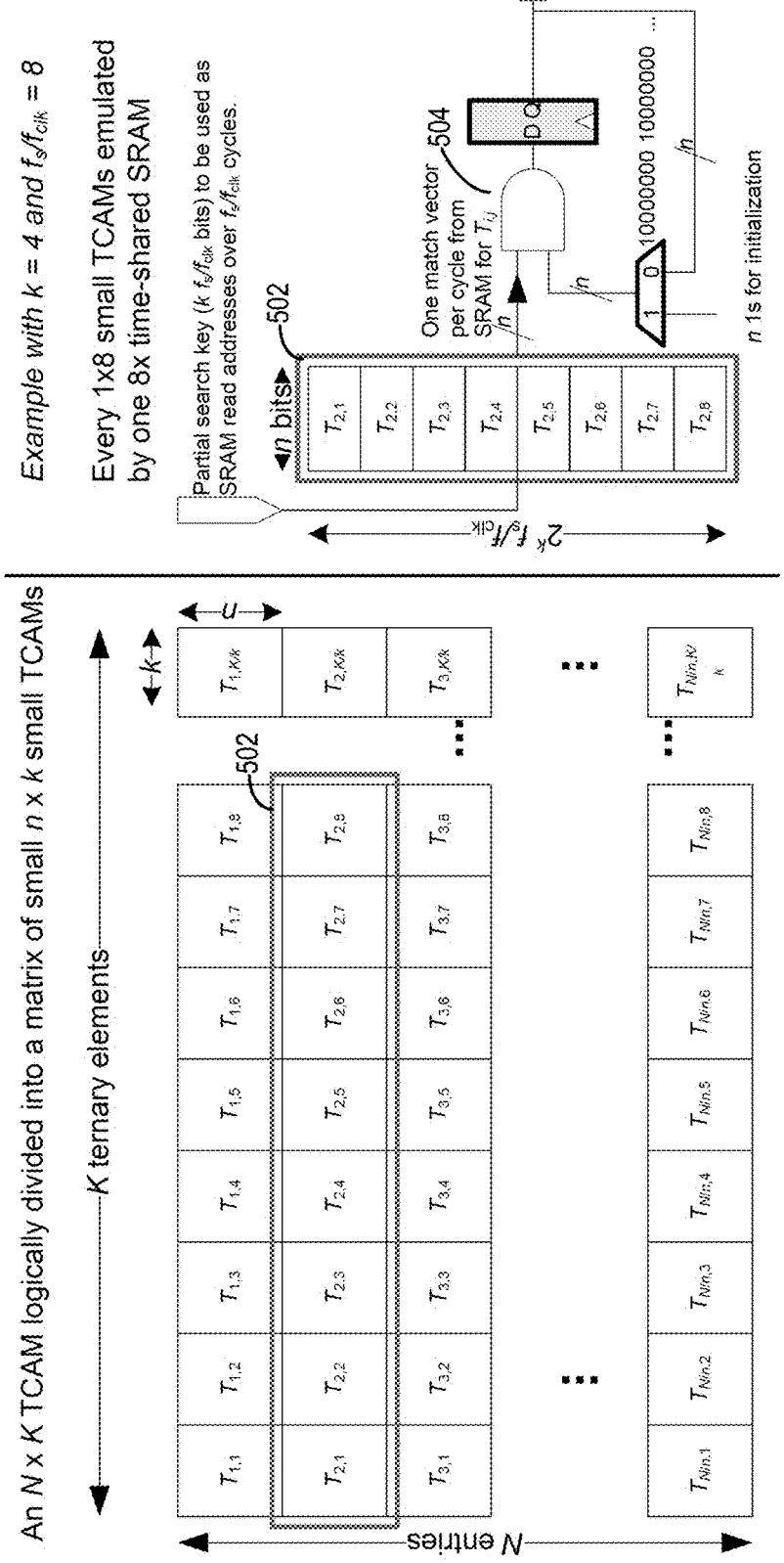
FIG. 5 shows xK TCAM logically divided into a matrix of small n×k small TCAMs, consistent with various implementations.

FIG. 5 shows an N×K TCAM logically divided into a matrix of small n×k small TCAMs, consistent with various implementations. The example depicted in FIG. 5 is shown with respect to k=4 and $f_{clk}/f_s = 8$. In this example, the partial row indicated by block 502 ($T_{2,1}$ through $T_{2,8}$) can be stored within a single SRAM that uses time sharing and read pointers consistent with the implementations discussed herein, including those discussed in connection with FIGS. 1-3. Thus, each block $T_{2,1}$ through $T_{2,8}$ could be assigned to a different context to implement the time sharing in a manner that allows an output vector to be generated using 8 time shared accesses of the SRAM.

It is recognized that $2 \leq D/(f_{clk}/f_s)$ since the D×W SRAM is time-shared. Every k bits of the partial search key corresponding to one particular column of the TCAM matrix form part of the SRAM read pointer. Without loss of generality, suppose these k bits form the lower bits of a $\lceil \log_2 D \rceil$-bit read pointer. The remaining $\lceil \log_e D \rceil - k$ bits enumerate the sequence 0,1, . . . , $f_{clk}/f_s - 1$. Each element of the sequence can be concatenated with one of the k-bit search keys to form an SRAM read pointer at the rate corresponding to $f_{clk}$, generating a total of $f_{clk}/f_s$ match vectors, each one n=W bits long. A sequential bitwise logical "AND" (504) of these match vectors over $f_{clk}/f_s$ clock cycles can be used as the match vector of the k $f_{clk}/f_s$-bit partial search key.

Various deviations from the specific examples shown in the figures are possible. For example, the partial search key might not go directly into the SRAM address port as discussed in connection with FIG. 5. There are multiple addresses entering the SRAM, one per time slot, and each address represents part of the search key. The number of time slots in the time-shared SRAM is $f_{clk}/f_s$. Sending these addresses into the SRAM in one cycle allows the FPGA to run at a clock rate lower than the fast SRAM clock rate $f_{clk}$. Consider $f_{clk}/f_s = 8$ as an example, where $f_{clk} = 1.2$ GHz. By sending in the entire search key in one cycle, a clock speed of 150 MHz is sufficient for the FPGA fabric. Suppose the SRAM is D×W=128×32. The address port of the SRAM is only seven bits wide, not wide enough to accommodate the search key in one cycle. In the example in FIG. 5, k=4 so the total width required of the partial search key is k $f_{clk}/f_s = 32$.

Since the write-data port of the SRAM is 32, and the write-data port is unused during a search, the write-data port can be reused as the key input. If the SRAM were 16 bits wide, the write-data port could still be reused to accept the key input but over two cycles instead.

Figure 6:
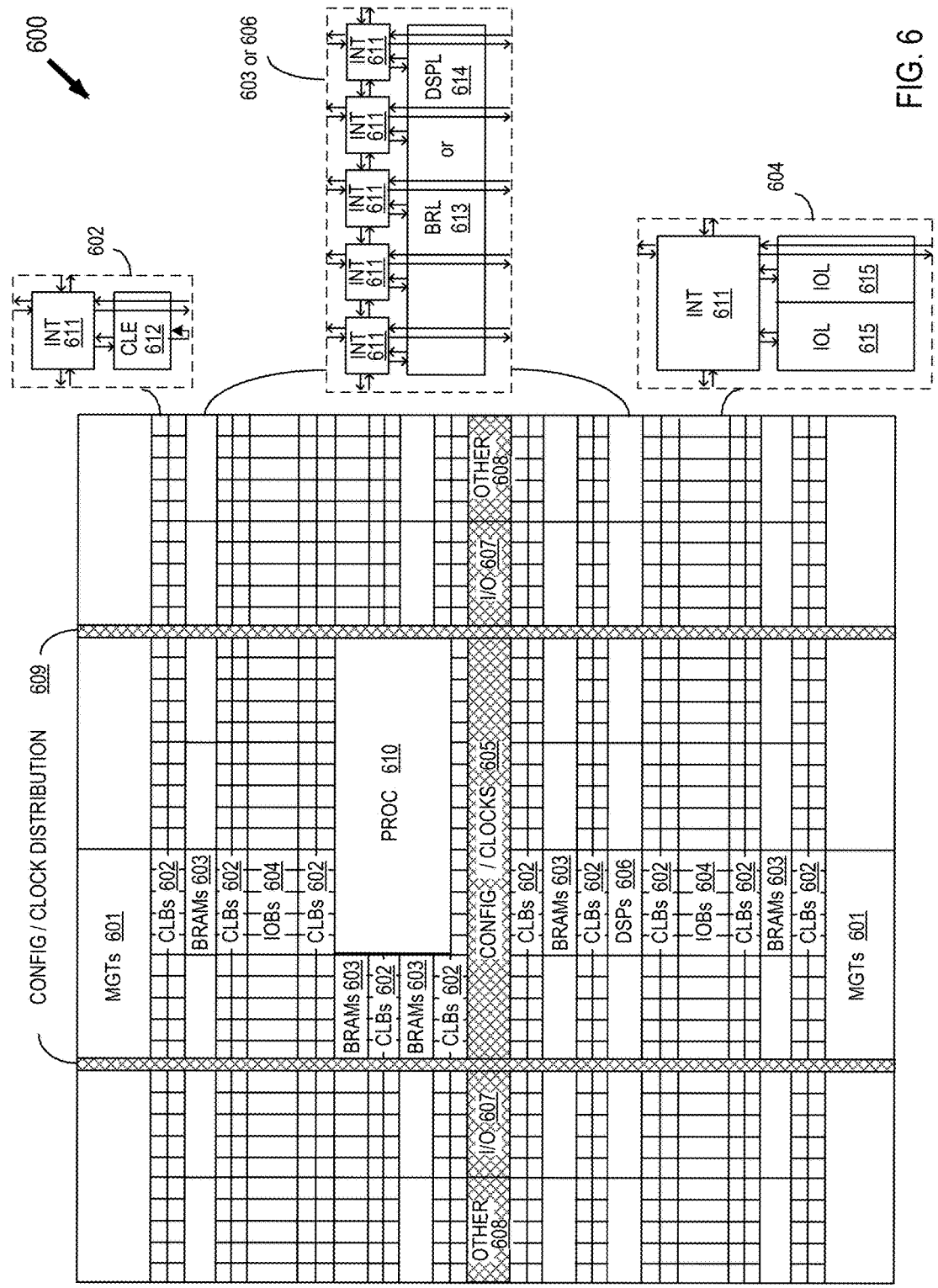
FIG. 6 shows a programmable integrated circuit (IC) on which the disclosed circuits and processes may be implemented.

FIG. 6 shows a programmable integrated circuit (IC) 600 on which the disclosed circuits and processes may be implemented. The programmable IC may also be referred to as a System-on-Chip (SOC) that includes field programmable gate array logic (FPGA) along with other programmable resources. FPGA logic may include several different types of programmable logic blocks in the array. For example, FIG. 6 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. Some programmable IC having FPGA logic also include dedicated processor blocks (PROC) 610 and internal and external reconfiguration ports (not shown).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Consistent with various implementations discussed herein, one or more of the BRAMs 603 can be configured to provide access to the memory of the device for multiple contexts. Typically, the number of interconnect elements included in a tile depends on the height of the tile. In the pictured implementation, a BRAM tile has the same height as five CLBs, but other numbers (e.g., four) can also be used. A DSP tile 606 can include a DSP logic element (DSPL) 614 in addition to an appropriate number of programmable interconnect elements. An IOB 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

In the pictured implementation, a columnar area near the center of the die (shown shaded in FIG. 6) is used for configuration, clock, and other control logic. Horizontal areas 609 extending from the column are used to distribute the clock signal and configuration signals across the breadth of the programmable IC. Note that the references to "columnar" and "horizontal" areas are relative to viewing the drawing in a portrait orientation.

Some programmable ICs utilizing the architecture illustrated in FIG. 6 include additional logic blocks that disrupt the regular columnar structure making up a large part of the programmable IC. The additional logic blocks can be programmable blocks and/or dedicated logic. For example, the processor block PROC 610 shown in FIG. 6 spans several columns of CLBs and BRAMs.

Note that FIG. 6 is intended to illustrate only an example programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 6 are merely an example. For example, in an actual programmable IC, more than one adjacent column of CLBs is typically included wherever the CLBs appear, to facilitate the efficient implementation of user logic.

Figure 7:
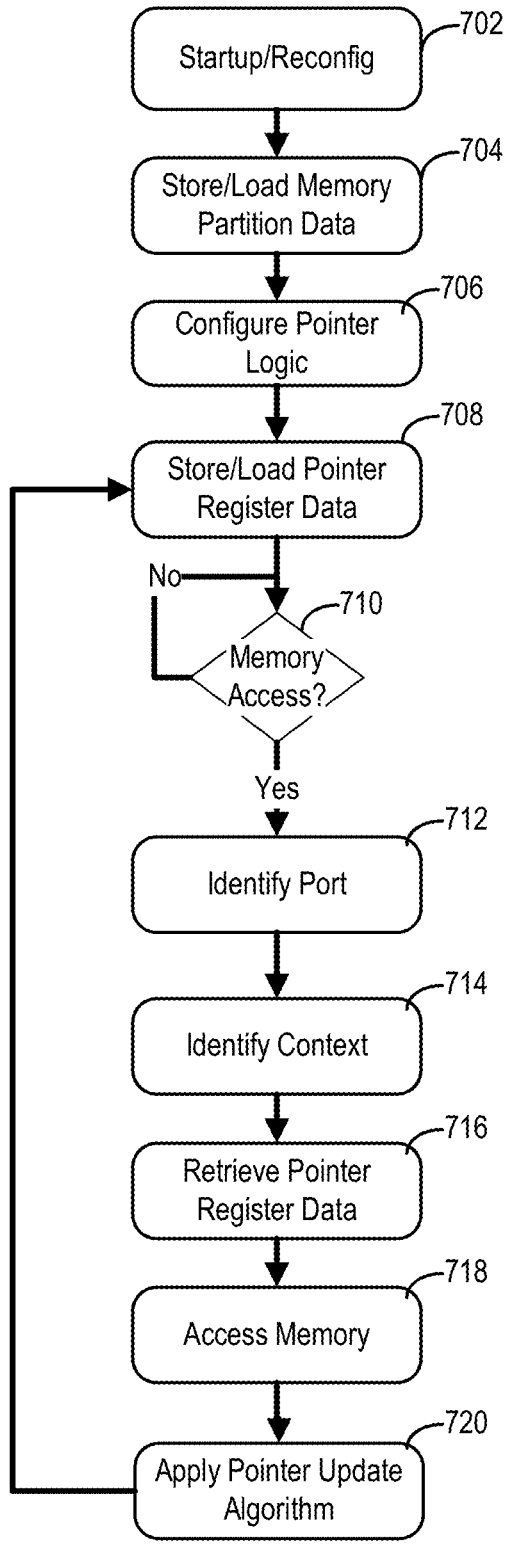
FIG. 7 depicts a flow diagram for use with a memory device that is accessible through switching fabric of a PLD, consistent with various implementations.

FIG. 7 depicts a flow diagram for use with a memory device that is accessible through switching fabric of a PLD, consistent with various implementations. The flow can begin with a startup or reconfiguration event, per block 702. In particular, this represents an event that results in a change to the partition memory definitions stored in the memory partition register circuit. As discussed herein, the memory partition register circuit can be configured for one time programming during initial programming (e.g., from a PLD programming bitstream), dynamic programming by writing to a configuration register, or both. Thus, the events may include the initial programming of the PLD, or a write to a configuration register linked to the memory partition register circuit. The memory partition data can then be stored, or loaded, into the memory partition register circuit, per block 704.

According to certain implementations, one or more arithmetic logical functions can be implemented for different pointer register circuits. For instance, the arithmetic logical function may provide functional emulation for different types of memory circuits, such as TCAM, circular buffers, for bit-reversed addressing, and combinations thereof. Various implementations allow the arithmetic logic functions to be configurable, per block 706. This can include, for instance, selecting from a preset number of logic functions that are built into the PLD, or allowing the pointer arithmetic unit to be programmed using software instructions that specify the desired logic function(s).

Consistent with various implementations, a plurality of pointer register circuits can be configured for updating on a time scale that is sufficient to utilize all, or most, of the throughput capabilities of a corresponding port of the RAM circuit. These pointer register circuits can be initialized to a preset value on startup, set by an application corresponding to the appropriate context, or both, per block 708.

The stored pointer values can remain unchanged until there is a memory access to the RAM circuit, per block 710. Upon a memory access, the port and context can be identified and determined per blocks 712 and 714, respectively. The identified port and context for the memory access can be used to identify and retrieve the appropriate pointer register data, per block 716. The pointer register data corresponds to an address for the RAM circuit and is thereby used to access the RAM circuit, per block 718. A pointer update logical function, as set in block 706, can then be applied to update the pointer register value, per block 720. The stored pointer values can then remain unchanged until there is a memory access to the RAM circuit, per block 710.

Those skilled in the art will appreciate that various alternative computing arrangements, including one or more processors and a memory arrangement configured with program code, would be suitable for hosting the processes and data structures that may carry out functions disclosed herein (e.g., frequency determination and control functions). In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems that use RAM circuits. Other aspects and features will be apparent to those skilled in the art from consideration of the specification. The portions of the methods and system may be implemented as one or more processors configured to execute software, as an application specific integrated circuit (ASIC), or as a logic on a programmable IC. Moreover, the various circuits identified herein may share hardware circuitry, such as use a common computer processing unit or digital processing unit. It is intended that the specification and drawings be considered as examples only, with a true scope of the invention being indicated by the following claims.

What is claimed is:

1. A memory device for use with a shared routing resource that provides access to the memory device, the memory device comprising:
   a random access memory (RAM) circuit that includes a plurality of ports configured to provide access to the RAM circuit by the shared routing resource;
   a memory partition register circuit configured to store a plurality of addresses, wherein each address of the plurality of addresses specifies a respective context partition of a plurality of context partitions within the RAM circuit;
   a plurality of pointer register circuits, wherein each pointer register circuit is associated with a corresponding port of the plurality of ports, each pointer register circuit is configured to store a respective set of pointers, and each pointer specifies a location in the RAM circuit within a respective one of the plurality of context partitions; and
   addressing logic that is configured to provide access to the RAM circuit using the respective set of pointers for each port of the plurality of ports.

2. The device of claim 1, wherein the addressing logic is configured to provide time-sharing access between the respective set of pointers.

3. The device of claim 1, wherein the addressing logic includes a pointer arithmetic unit that is configured to update pointers of the respective sets of pointers in the plurality of pointer register circuits according to an arithmetic function corresponding to a particular functional emulation for the RAM circuit.

4. The device of claim 3, wherein the particular functional emulation is of a circular buffer.

5. The device of claim 3, wherein the particular functional emulation is for bit-reversed addressing.

6. The device of claim 3, wherein the particular functional emulation is for ternary content-addressable memory (TCAM).

7. The device of claim 6, wherein the functional emulation includes sending a partial search key that spans multiple columns of a TCAM matrix to the pointer arithmetic unit and at a first rate that is less than an access rate of the RAM circuit.

8. The device of claim 1, wherein the memory device is part of a programmable integrated circuit (IC) and the shared routing resource is switching fabric of the programmable IC.

9. The device of claim 3, wherein the particular functional emulation is for digit-reversed addressing.

10. A method of using a memory device that is accessible through a shared routing resource, the method comprising:
   storing, in a memory partition register circuit, a plurality of addresses, each address of the plurality of addresses specifying a respective context partition of a plurality of context partitions within a random access memory (RAM) circuit;
   storing, in each of a plurality of pointer register circuits, a respective set of pointers, wherein each pointer of in the respective set of pointers specifies location in the RAM circuit within a respective one of the plurality of context partitions, and each register circuit corresponds to a port from a plurality of ports of the RAM circuit that is configured to provide access to the RAM circuit by the shared routing resource; and
   providing, using addressing logic, access to the RAM circuit using the respective set of pointers for each port.

11. The method of claim 10, wherein the memory device is part of a programmable integrated circuit (IC), the shared routing resource is a switching fabric, and the plurality of ports provide faster access than an access rate of the switching fabric used by the set of pointers.

12. The method of claim 11, wherein the providing access to the RAM circuit using the respective set of pointers for each port, includes time-sharing access between the respective set of pointers such that the accesses by the respective set of pointers is collectively faster than the access rate of the shared routing resource.

13. The method of claim 10, further comprising updating, using a pointer arithmetic unit of the addressing logic, pointers of the respective sets of pointers in the plurality of pointer register circuits according to an arithmetic function corresponding to a particular functional emulation for the RAM circuit.

14. The method of claim 13, wherein the particular functional emulation is of a circular buffer.

15. The method of claim 13, wherein the particular functional emulation is for bit-reversed addressing.

16. The method of claim 13, wherein the particular functional emulation is for ternary content-addressable memory (TCAM).

17. The method of claim 16, wherein the functional emulation includes sending a partial search key that spans multiple columns of a TCAM matrix to the pointer arithmetic unit and at a first rate that is less than an access rate of the RAM circuit.

18. The method of claim 17, wherein the functional emulation includes a sequential bitwise logical AND of match vectors from the TCAM matrix.

19. The method of claim 13, wherein the particular functional emulation is for digit-reversed addressing.

* * * * *